(12) United States Patent
Kim et al.

(10) Patent No.: US 7,145,141 B2
(45) Date of Patent: Dec. 5, 2006

(54) INFRARED BOLOMETER

(75) Inventors: Tae-Sik Kim, Yuseong-gu (KR); Hee Chul Lee, Yuseong-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 10/981,670

(22) Filed: Nov. 5, 2004

(65) Prior Publication Data

US 2005/0133721 A1    Jun. 23, 2005

(30) Foreign Application Priority Data

Dec. 17, 2003    (KR)    ...................... 10-2003-0092653

(51) Int. Cl.
    *G01J 5/00* (2006.01)
(52) U.S. Cl. ................................. 250/338.1
(58) Field of Classification Search .............. 250/338.1
    See application file for complete search history.

(56) References Cited

U.S. PATENT DOCUMENTS 5,300,915 A    4/1994    Higashi et al.
6,144,285 A    11/2000   Higashi
6,392,232 B1*  5/2002    Gooch et al. ............... 250/332

* cited by examiner

Primary Examiner—David Porta
Assistant Examiner—Marcus Taningco
(74) Attorney, Agent, or Firm—Global IP Counselors, LLP

(57) ABSTRACT

The present invention discloses an infrared bolometer including a signal bridge used for reading a resistance value varied by infrared heat and removing residual heat of a heat absorbing layer. The infrared bolometer includes a lower substrate having an integrated circuit coated with a protection layer, an upper substrate having an absorbing layer for absorbing infrared rays and a resistor whose resistance value is varied by the infrared heat absorbed by the absorbing layer and spaced apart from the lower substrate by a predetermined distance, a post for mechanically supporting the upper substrate and connecting the upper and lower substrate to each other, and a signal bridge arranged between the lower and upper substrates for transmitting a signal from the resistor of the upper substrate to the lower substrate. The infrared bolometer further includes a lower electrode formed on the top surface of the lower substrate for driving the signal bridge to be electrically connected/disconnected to/from the upper substrate, and a reflecting layer formed on the top surface of the lower substrate for increasing absorptivity of infrared heat.

16 Claims, 5 Drawing Sheets

INFRARED BOLOMETER

BACKGROUND OF THE INVENTION

1. Field of the Invention

The present invention relates to a bolometer that is an infrared sensor, and more particularly, to an infrared bolometer having a signal bridge used for reading a resistance value varied by infrared heat and removing the residual heat of a heat absorption layer.

2. Background of the Related Art

A bolometer that is a kind of infrared sensor absorbs infrared rays radiated from an object and converts the infrared rays into thermal energy, resulting in a temperature increase which varies an electric resistance. The bolometer measures the varied resistance to sense the object.

The bolometer is employed in both commercial and military fields. The bolometer is constructed in such a manner that an absorbent body for absorbing infrared heat of an object and a resistor whose resistance value is varied by the absorbed heat are separated from a substrate by a signal bridge.

Figure 1:
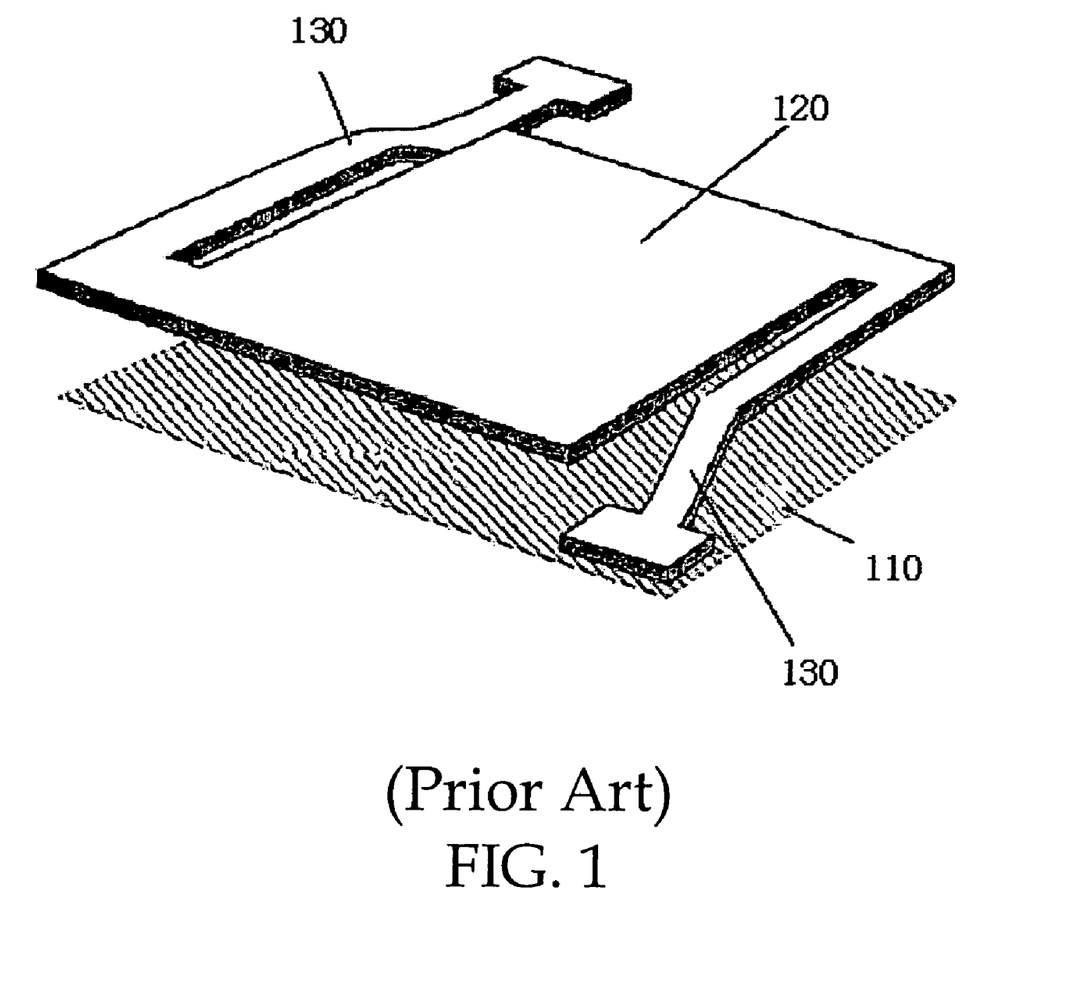
FIG. 1 illustrates a conventional infrared bolometer.

FIG. 1 illustrates a conventional bolometer. Referring to FIG. 1, the bolometer includes a lower substrate 110, an upper substrate 120, and a signal bridge 130. The lower substrate has an integrated circuit built therein for reading a signal, the integrated circuit built being coated with a protection layer. The upper substrate 120 includes an absorbing layer (not shown) for absorbing infrared rays and a resistor (not shown) whose resistance value is varied by infrared heat absorbed by the absorbent. The upper substrate is spaced apart from the lower substrate 110 by a predetermined distance. The signal bridge 130 connects the upper and lower substrates to each other mechanically or electrically.

The bolometer having the aforementioned structure receives a resistance signal from the resistor of the upper substrate 120 through the signal bridge 130 and controls the resistance signal through the integrated circuit of the lower substrate 110 to sense the temperature of an external object.

To improve the performance of the bolometer, infrared heat radiated from the object must be absorbed without loss and residual heat must be completely removed after the signal is measured. In the conventional bolometer structure, the signal bridge 130 mechanically or electrically connects the upper substrate 120 to the lower substrate 110 and, simultaneously, removes residual heat after the signal is measured.

However, the signal bridge 130 is made of a metal material capable of transmitting an electric signal so that it can have high thermal conductivity. High thermal conductivity results in a loss of heat when the bolometer absorbs infrared heat.

To solve this problem, the signal bridge 130 is made long enough to reduce the thermal conductivity of the bolometer. However, there is a limitation in increasing the length of the signal bridge 130 because a pixel size is fixed.

Furthermore, for the conventional bolometer, heat stored in the resistor may not be completely removed after the signal is read although the length of the signal bridge 130 is increased to reduce the thermal conductivity. The residual heat contributes to an increase in the temperature of the resistor together with self-heating to thereby deteriorate the performance of the bolometer.

SUMMARY OF THE INVENTION

Accordingly, the present invention has been made in view of the above problems and it is an object of the present invention is to provide an infrared bolometer having a signal bridge that comes into contact with a resistor only when a signal is transmitted from the resistor to a substrate and residual heat is removed from the resistor to reduce thermal conductivity, thereby improving the performance of the bolometer.

To accomplish the above object, in one aspect of the present invention, there is provided an infrared bolometer for sensing infrared heat, including: a lower substrate having integrated circuit coated with a protection layer; an upper substrate having an absorbing layer for absorbing infrared rays and a resistor whose resistance value is varied by the infrared heat absorbed by the absorbing layer, the upper substrate being spaced apart from the lower substrate by a predetermined distance; a post for mechanically supporting the upper substrate and connecting the upper and lower substrates to each other; a signal bridge arranged between the lower and upper substrates for transmitting a signal from the resistor of the upper substrate to the lower substrate; a lower electrode formed on the top surface of the lower substrate for driving the signal bridge to be electrically connected/disconnected to/from the upper substrate; and a reflecting layer formed on the top surface of the lower substrate for increasing absorptivity of infrared heat.

To accomplish the above object, in another aspect of the present invention, there is also provided an infrared bolometer for sensing infrared heat, including: a lower substrate having an integrated circuit coated with a protection layer; an upper substrate having an absorbing layer for absorbing infrared rays and a resistor whose resistance value is varied by the infrared heat absorbed by the absorbing layer, the upper substrate being spaced apart from the lower substrate by a predetermined distance; a post for mechanically supporting the upper substrate and connecting the upper and lower substrates to each other; a signal bridge arranged between the lower and upper substrates for transmitting a signal from the resistor of the upper substrate to the lower substrate, the signal bridge having a piezoelectric element and a signal transfer layer; an electrode for applying voltage to the piezoelectric element; and a reflecting layer formed on the top surface of the lower substrate for increasing absorptivity of infrared heat.

To accomplish the above object, in another aspect of the present invention, there is also provided an infrared bolometer for sensing infrared heat, including: a lower substrate having an integrated circuit coated with a protection layer; an upper substrate having an absorbing layer for absorbing infrared rays and a resistor whose resistance value is varied by the infrared heat absorbed by the absorbing layer, the upper substrate being spaced apart from the lower substrate by a predetermined distance; a post for mechanically supporting the upper substrate and connecting the upper and lower substrates to each other; a signal bridge arranged between the lower and upper substrates for transmitting a signal from the resistor of the upper substrate to the lower substrate, the signal bridge being formed of at least two laminated layers, each of the materials of which has different thermal expansion coefficients; a heat transfer layer for transferring heat to the signal bridge; and a reflecting layer formed on the top surface of the lower substrate for increasing absorptivity of infrared heat.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

[First Embodiment]

The structure and operation of an infrared bolometer according to a first embodiment of the present invention will now be explained.

Figure 2:
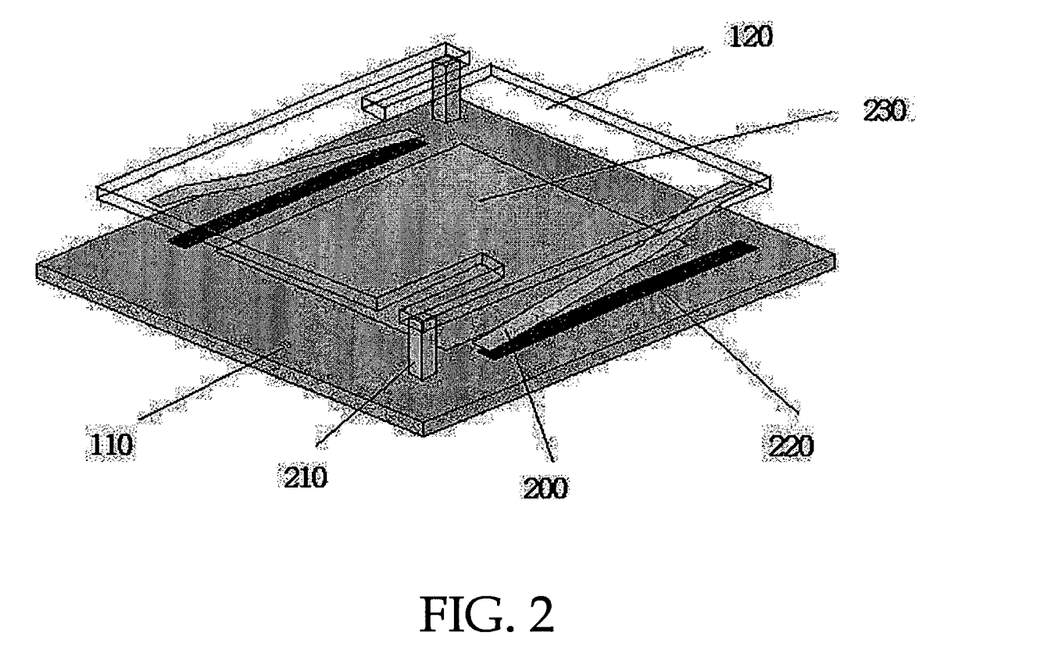
FIG. 2 is a perspective view of an infrared bolometer according to a first embodiment of the present invention.
Figure 3:
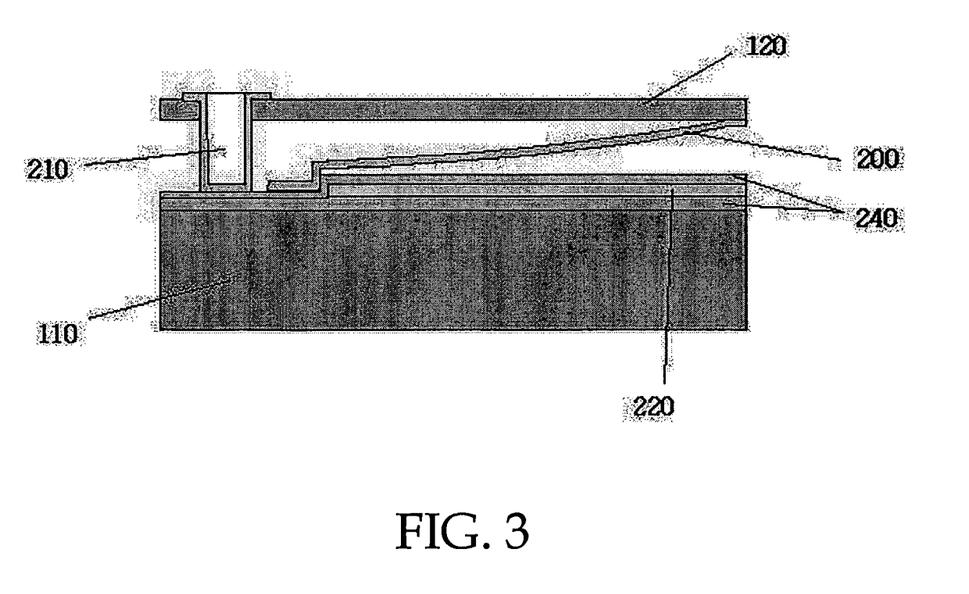
FIG. 3 is a cross-sectional view of the infrared bolometer according to the first embodiment of the present invention.

FIG. 2 is a perspective view of the infrared-bolometer according to the first embodiment of the present invention, and FIG. 3 is a cross-sectional view of the infrared bolometer according to the first embodiment of the present invention.

Referring to FIGS. 2 and 3, the infrared bolometer according to the first embodiment of the present invention includes a lower substrate 110, an upper substrate 120, a post 210, a signal bridge 200, a lower electrode 220 and a reflecting layer 230. The lower substrate 110 includes an integrated circuit built therein for reading a signal, the integrated circuit being coated with a protection layer. The upper substrate 120 includes an absorption layer (not shown) for absorbing infrared rays and a resistor (not shown) whose resistance value is varied by the infrared heat absorbed by the absorbing layer and is spaced apart from the lower substrate 110 by a predetermined distance. The post 210 mechanically connects the upper substrate 120 to the lower substrate 110 and supports the upper substrate 120. The signal bridge 200 comes into contact with the resistor only when a signal is transmitted from the resistor to the lower substrate 110 and residual heat of the resistor is removed after the signal is output. The lower electrode 220 is formed on the top surface of the lower substrate 110 to drive the signal bridge 200 to be electrically connected/disconnected to/from the upper substrate 120. The reflecting layer 230 is formed on the top surface of the lower substrate 110 to increase absorptivity of infrared heat.

The lower substrate 110 is coated with an insulating material such as silicon nitride SixNy, and materials such as Au, Al, Cr, Ni, Ti and so on, which will be coated on the lower electrode 110 and the reflecting layer 230, are deposited on the insulating material layer. The signal bridge 200 for reading a signal is formed on an insulating material such as SixNy, SiO2 and so on, which is deposited on the lower substrate to prevent the signal bridge 200 and the lower electrode 220 from short-circuiting. The signal bridge 200 is formed such that it is in contact with the resistor formed on the upper substrate in the initial state and has high thermal conductivity. The resistor and the absorbing layer are formed on the signal bridge. Thermal conductivity of the post 210 supporting the upper substrate 120 of the bolometer is made lower than $3 \times 10^{-8}$ W/mK. The resistor and the absorbing layer are formed on the post.

Here, the signal bridge 200 is formed in a multi-layered structure using at least one selected from the group consisting of Al, SiO2, SixNy, Cr, Au, Ti, Ni, polysilicon and silicon. Preferably, multiple layers constructing the multi-layered signal bridge are respectively formed of different materials.

The materials forming the signal bridge 200 have different remaining stresses and, when the signal bridge is formed of at least two materials, the effect of extension of the materials according to the remaining stresses is significantly increased. A technique using the remaining stress of a material is well known in the field of Self-Adjusting Microstructures (SAMS).

It is preferable that the signal bridge 200 is designed such that thermal energy stored in the resistor of the upper substrate 120 is not transmitted to the lower substrate 110 through the signal bridge 200 for several to tens microsecond during which the signal bridge reads a signal. Furthermore, the signal bridge is preferably formed such that it has thermal conductivity capable of sufficiently removing residual heat left in the resistor of the upper substrate 120 for several milliseconds after the signal bridge reads a signal.

Figure 4:
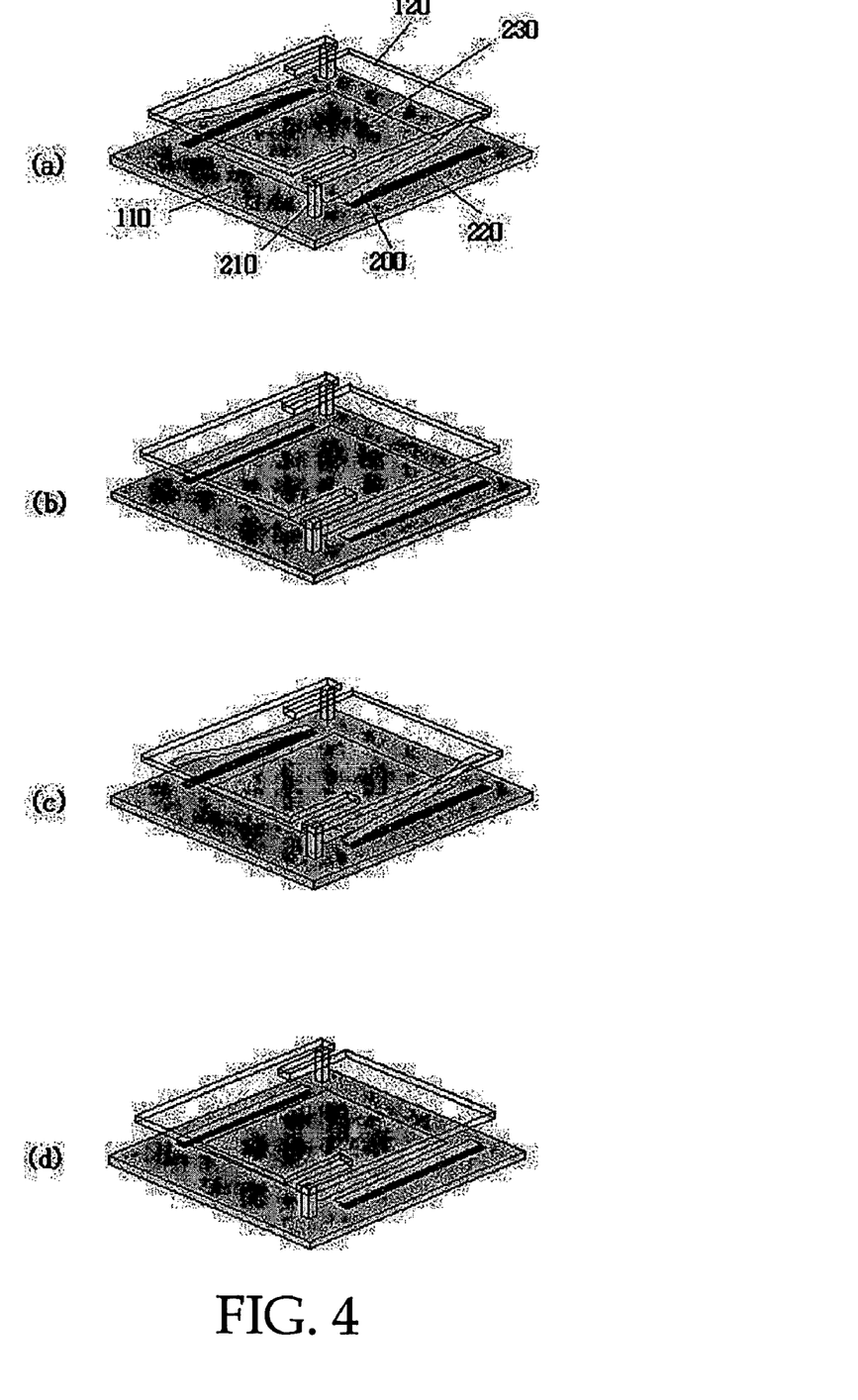
FIG. 4 illustrates diagrams for explaining the operation of the infrared bolometer according to the first embodiment of the present invention.

FIG. 4 illustrates diagrams for explaining the operation of the infrared bolometer according to the first embodiment of the present invention.

FIG. 4(a) shows the initial state of the bolometer. In the initial state, the signal bridge 200 and the lower electrode 220 are grounded. Here, the signal bridge 200 is formed of two material layers having different remaining stresses and bent at a portion adjacent to the upper substrate 120. An insulating material (not shown) is coated between the signal bridge 200 and the lower electrode 220 to prevent the signal bridge 200 and the lower electrode 220 from short-circuiting.

Referring to FIG. 4(b), when voltage is applied to the lower substrate 220, electrostatic force is generated between the signal bridge 200 bent by stress (remaining stress) and the lower electrode 220. Then, the electrostatic force pulls the signal bridge 200 toward the lower electrode 220 such that the resistor on the upper substrate 120 and the signal bridge 220 are separated from each other.

Thermal conduction of the bolometer in the state where the signal bridge 200 is separated from the resistor on the upper substrate 120 occurs only through the post 210 that mechanically supports the resistor substrate. Thus, thermal conductivity of the bolometer is much lower than that of the conventional bolometer. Accordingly, when the conventional bolometer and the bolometer of the present invention absorb the same quantity of infrared heat, the bolometer of the present invention stores thermal energy much larger than that stored by the conventional bolometer in the resistor on the upper substrate 120, thereby improving the performance of the bolometer. The thermal energy stored in the bolometer varies the resistance of the resistor on the upper substrate 120.

FIG. 4(*c*) shows the state where a variation in the resistance value of the resistor on the upper substrate 120 is transmitted to the lower substrate 110. When supply of voltage to the lower electrode 110 is interrupted, the signal bridge 200 comes into contact with the resistor on the upper substrate 120. Here, voltage or current is applied to the signal bridge 200 to read a variation in the resistance of the resistor. Then, the signal bridge 200 is in contact with the resistor for several milliseconds in order to completely remove residual heat stored in the resistor of the upper substrate 110 after the reading of the signal.

Referring to FIG. 4(*d*), a voltage is applied to the lower electrode 110 to pull the signal bridge 200 toward the lower electrode 220 such that the signal bridge 200 is separated from the resistor of the upper substrate 120. Then, the resistor receives infrared heat again to accumulate thermal energy, and the above steps shown in FIGS. 4(*a*), 4(*b*) and 4(*c*) are repeatedly performed.

[Second Embodiment]

The structure and operation of the infrared bolometer according to a second embodiment of the present invention will now be explained.

Figure 5:
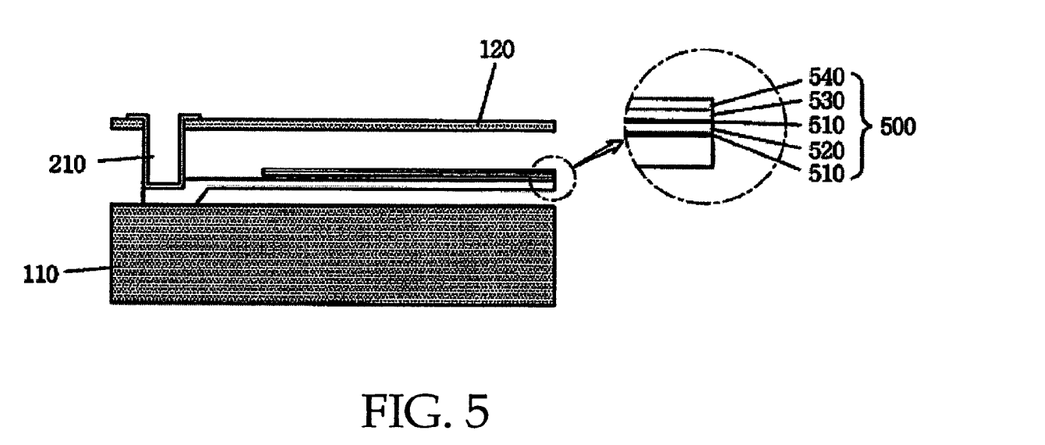
FIG. 5 is a cross-sectional view of an infrared bolometer according to a second embodiment of the present invention.
Figure 6:
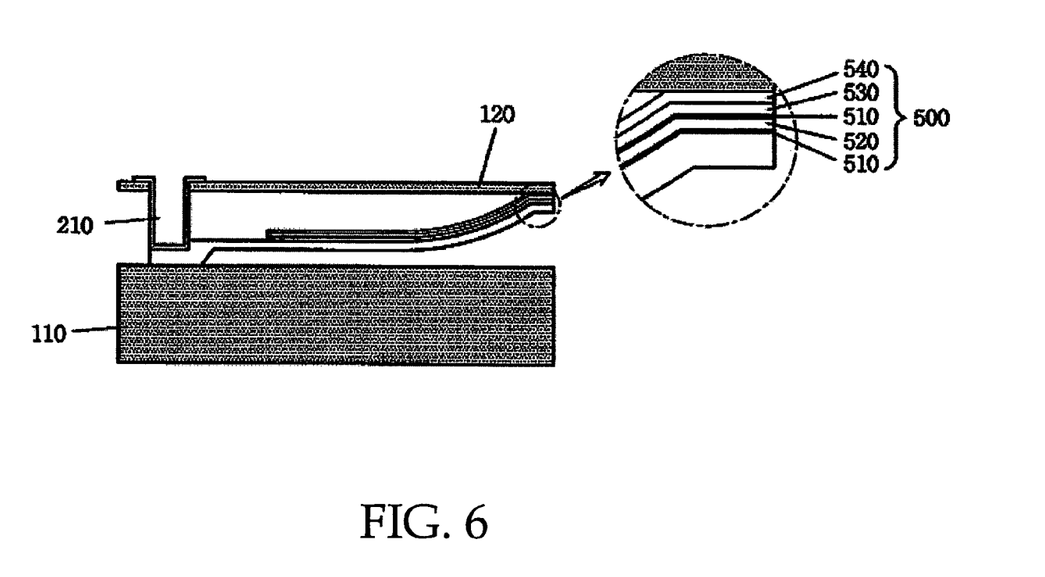
FIG. 6 is a cross-sectional view showing the structure of the infrared bolometer according to the second embodiment of the present invention when the infrared bolometer transmits a signal and radiates residual heat.

FIG. 5 is a cross-sectional view of the infrared bolometer according to the second embodiment of the present invention, and FIG. 6 is a cross-sectional view showing the structure of the infrared bolometer according to the second embodiment of the present invention when the infrared bolometer transmits a signal and radiates residual heat.

Referring to FIGS. 5 and 6, the infrared bolometer according to the second embodiment of the present invention includes a lower substrate 110, an upper substrate 120, a post 210, a signal bridge 500, and a reflecting layer (not shown). The lower substrate 110 includes an integrated circuit built therein for reading a signal, the integrated circuit being coated with a protection layer. The upper substrate 120 includes an absorption layer (not shown) for absorbing infrared rays and a resistor (not shown) whose resistance value is varied by the infrared heat absorbed by the absorbing layer, and is spaced apart from the lower substrate 110 by a predetermined distance. The post 210 mechanically connects the upper substrate 120 to the lower substrate 110 and supports the upper substrate 120. The signal bridge 500 comes into contact with the resistor only when a signal is transmitted from the resistor to the lower substrate 110 and residual heat of the resistor is removed after the signal is output. The reflecting layer increases absorptivity of infrared heat.

The signal bridge 500 consists of electrodes 510 to which a voltage is applied, a piezoelectric element 520 formed between the electrodes 510, an insulating layer 530 for insulating the electrodes 510, and a signal transfer layer 540 for transferring a signal from the resistor on the upper substrate 120 so that it is mechanically bent. Preferably, the piezoelectric element 520 that is a main component of the signal bridge 500 is preferably formed of any one of SiO2, Pb(Zr,Ti)O3;PZT, ZnO and BaTiO3.

The signal bridge 500 uses piezoelectricity through the piezoelectric element 520. Piezoelectric effect includes a direct piezoelectric effect and a converse piezoelectric effect. The direct piezoelectric effect refers to a phenomenon where an output terminal of the piezoelectric element generates an electric signal when external stress or vibration displacement is applied to the piezoelectric element. The converse piezoelectric effect refers to a phenomenon where a mechanical displacement occurs in the piezoelectric element when an external voltage is applied to the piezoelectric element.

The signal bridge of the infrared bolometer according to the second embodiment of the present invention is constructed using the converse piezoelectric effect.

The operation of the infrared bolometer according to the second embodiment of the present invention will now be explained. Since the operation of the infrared bolometer according to the second embodiment of the present invention is basically identical to the operation of the infrared bolometer according to the first embodiment of the present invention, an explanation which will be given hereinafter focuses on the signal bridge different from that of the first embodiment of the invention.

Referring to FIG. 5, the signal bridge 500 is not supplied with a voltage and placed in parallel with the lower substrate 110 in the initial state. In this state, the absorbing layer of the upper substrate 120 absorbs infrared heat of an external object.

Referring to FIG. 6, when a voltage is applied to the electrodes 510 respectively placed on the top and bottom of the piezoelectric element 520, the piezoelectric element 520 is contracted in the horizontal direction to be bent toward the upper substrate 120. The resistance value of the resistor of the upper substrate 120 is transferred to the lower substrate 110 through the signal transfer layer 540 and the resistance value is read to sense the temperature of the external object. After the signal is read, the signal bridge 500 is in contact with the resistor for several milliseconds in order to completely remove residual heat of the resistor of the upper substrate 120.

[Third Embodiment]

The structure and operation of an infrared bolometer according to a third embodiment of the present invention will now be explained.

Figure 7:
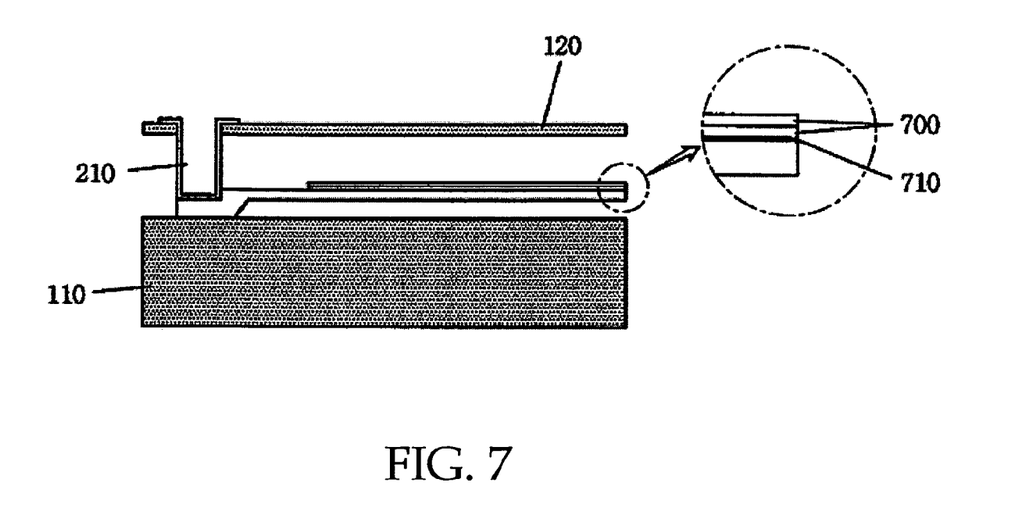
FIG. 7 is a cross-sectional view of an infrared bolometer according to a third embodiment of the present invention.
Figure 8:
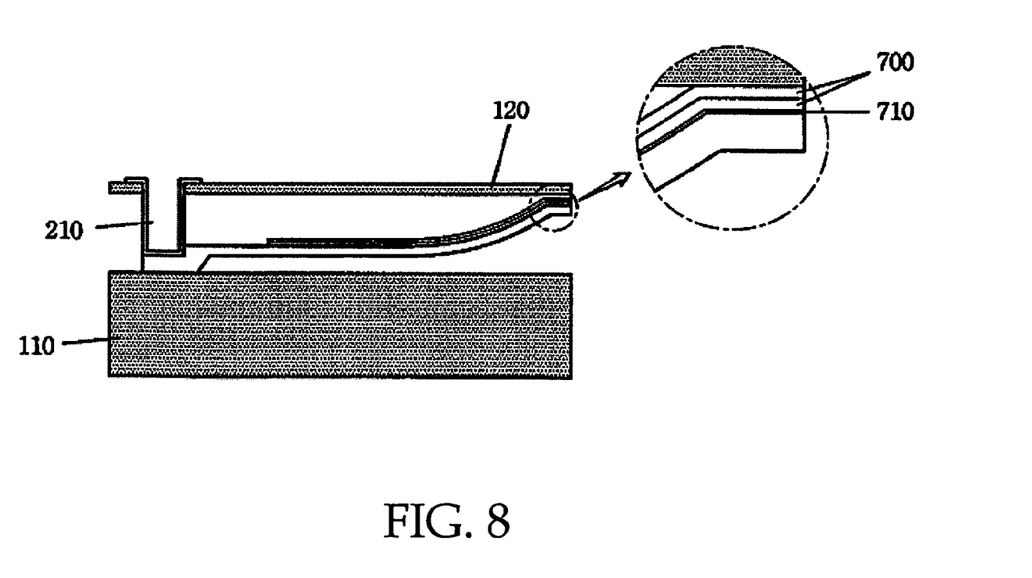
FIG. 8 is a cross-sectional view showing the structure of the infrared bolometer according to the third embodiment of the present invention when the infrared bolometer transmits a signal and radiates residual heat.

FIG. 7 is a cross-sectional view of the infrared bolometer according to the third embodiment of the present invention, and FIG. 8 is a cross-sectional view showing the structure of the infrared bolometer according to the third embodiment of the present invention when the infrared bolometer transmits a signal and radiates residual heat.

Referring to FIGS. 7 and 8, the infrared bolometer according to the third embodiment of the present invention includes a lower substrate 110, an upper substrate 120, a post 210, a signal bridge 700, a heat transfer layer 710, and a reflecting layer (not shown). The lower substrate 110 includes an integrated circuit built therein for reading a signal, the integrated circuit being coated with a protection layer. The upper substrate 120 includes an absorption layer (not shown) for absorbing infrared rays and a resistor (not shown) whose resistance value is varied by the infrared heat absorbed by the absorbing layer and is spaced apart from the lower substrate 110 by a predetermined distance. The post 210 mechanically connects the upper substrate 120 to the lower substrate 110 and supports the upper substrate 120. The signal bridge 700 comes into contact with the resistor only when a signal is transmitted from the resistor to the lower substrate 110 and residual heat of the resistor is removed after the signal is output. The heat transfer layer 710 transfers heat to the signal bridge 700. The reflecting layer increases absorptivity of infrared heat.

The signal bridge 700 is formed of two laminated layers having different thermal expansion coefficients such that the signal bridge is mechanically bent. Preferably, each of the laminated layers constituting the signal bridge is formed of any one selected from the group consisting of Al, SiO2, SixNy, Cr, Au, Ti, Ni, polysilicon and silicon.

That is, the infrared bolometer according to the third embodiment of the present invention uses thermal expansion coefficients of the materials constituting the signal bridge 700.

The operation of the infrared bolometer according to the third embodiment of the present invention will now be explained. Since the operation of the infrared bolometer according to the third embodiment of the present invention is basically identical to that of the infrared bolometer according to the first embodiment of the present invention, an explanation which will be given hereinafter focuses on the signal bridge different from that of the first embodiment of the invention.

Referring to FIG. 7, the heat transfer layer 710 for transferring heat to the signal bridge 700 is not supplied with current and located in parallel with the lower substrate 110 in the initial state. In this state, the absorbing layer of the upper substrate 120 absorbs infrared heat of an external object.

Referring to FIG. 8, when current is applied to the heat transfer layer 710, the signal bridge 700 is bent toward the upper substrate 120 according to a difference in thermal expansion coefficients between materials constituting the signal bridge, and the resistance value of the resistor of the upper substrate 120 is transmitted to the lower substrate 110 through the signal bridge 700. The bolometer reads the resistance value to sense the temperature of the external object. After the resistance value is read, the signal bridge 700 is in contact with the resistor for several milliseconds in order to completely remove residual heat of the resistor of the upper substrate 120.

Preferably, the thermal expansion coefficient of the upper layer of the signal bridge 700 is made smaller than that of the lower layer of the signal bridge 700 in order to bend the signal bridge 700 toward the upper substrate 120.

As described above, the present invention can provide the signal bridge that comes into contact with the resistor only when a signal is transmitted from the resistor to the lower substrate and residual heat is removed from the resistor. Furthermore, thermal conductivity of the infrared bolometer is remarkably reduced, and hence response of the bolometer can be improved. Moreover, the signal bridge can be applied to commercial and military bolometers.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An infrared bolometer for sensing infrared heat, comprising:
   a lower substrate having an integrated circuit coated with a protection layer;
   an upper substrate having an absorbing layer being configured to absorb infrared rays and a resistor having a resistance value varied by the infrared heat absorbed by the absorbing layer, the upper substrate being spaced apart from the lower substrate by a predetermined distance;
   a post being configured to support mechanically the upper substrate and to connect the upper and lower substrates to each other;
   a signal bridge being arranged between the lower and upper substrates being configured to transmit a signal from the resistor of the upper substrate to the lower substrate;
   a lower electrode being formed on the top surface of the lower substrate to drive the signal bridge to connect and to disconnect electrically and mechanically to and from the upper substrate; and
   a reflecting layer being formed on the top surface of the lower substrate to increase absorptivity of infrared heat.

2. The infrared bolometer as claimed in claim 1, wherein the signal bridge is formed of at least two laminated layers, and materials of the laminated layers have different remaining stresses.

3. The infrared bolometer as claimed in claim 1, wherein the signal bridge is formed of at least one selected from the group consisting of Al, SiO2, SixNy, Cr, Au, Ti, Ni, polysilicon, and silicon.

4. The infrared bolometer as claimed in claim 2, wherein the laminated layers of the signal bridge are formed of different materials, respectively, and each of the laminated layers is formed of at least one selected from the group consisting of Al, SiO2, SixNy, Cr, Au, Ti, Ni, polysilicon, and silicon.

5. The infrared bolometer as claimed in claim 4, wherein the signal bridge is bent toward the upper substrate due to the remaining stress of the material forming each of the laminated layers of the signal bridge.

6. The infrared bolometer as claimed in claim 4, wherein an insulating layer is formed between the signal bridge and the lower electrode and between the lower electrode and the lower substrate to prevent the signal bridge and the lower electrode as well as the lower electrode and the lower substrate from short-circuiting.

7. An infrared bolometer for sensing infrared heat, comprising:
   a lower substrate having an integrated circuit coated with a protection layer;
   an upper substrate having an absorbing layer to absorb infrared rays and a resistor having a resistance value varied by the infrared heat absorbed by the absorbing layer, the upper substrate being spaced apart from the lower substrate by a predetermined distance;
   a post being configured to support mechanically the upper substrate and to connect the upper and lower substrates to each other;
   a signal bridge being arranged between the lower and upper substrates to transmit a signal from the resistor of the upper substrate to the lower substrate, the signal bridge having a piezoelectric element and a signal transfer layer;
   an electrode being configured to apply voltage to the piezoelectric element; and
   a reflecting layer being formed on the top surface of the lower substrate to increase absorptivity of infrared heat.

8. The infrared bolometer as claimed in claim 7, wherein the piezoelectric element is made of at least one of SiO2, Pb(Zr,Ti)O3;PZT, ZnO, and BaTiO3.

9. An infrared bolometer for sensing infrared heat, comprising:
- a lower substrate having an integrated circuit coated with a protection layer;
- an upper substrate having an absorbing layer being configured to absorb infrared rays and a resistor having a resistance value varied by the infrared heat absorbed by the absorbing layer, the upper substrate being spaced apart from the lower substrate by a predetermined distance;
- a post being configured to support mechanically the upper substrate and to connect the upper and lower substrates to each other;
- a signal bridge being arranged between the lower and upper substrates to transmit a signal from the resistor of the upper substrate to the lower substrate, the signal bridge being formed of at least two laminated layers, each of the materials of the layers having different thermal expansion coefficients to connect and to disconnect mechanically to and from at least one of the lower and upper substrates;
- a heat transfer layer being configured to transfer heat to the signal bridge; and
- a reflecting layer being formed on the top surface of the lower substrate to increase absorptivity of infrared heat.

10. The infrared bolometer as claimed in claim 9, wherein the laminated layers forming the signal bridge are formed of different materials, respectively, and each of the layers is formed of at least one selected from the group consisting of Al, SiO2, SixNy, Cr, Au, Ti, Ni, polysilicon, and silicon.

11. The infrared bolometer as claimed in claim 3, wherein the signal bridge is bent toward the upper substrate due to the remaining stress of the material forming each of the laminated layers of the signal bridge.

12. The infrared bolometer as claimed in claim 2, wherein the signal bridge is bent toward the upper substrate due to the remaining stress of the material forming each of the laminated layers of the signal bridge.

13. The infrared bolometer as claimed in claim 1, wherein the signal bridge is bent toward the upper substrate due to the remaining stress of the material forming each of the laminated layers of the signal bridge.

14. The infrared bolometer as claimed in claim 3, wherein an insulating layer is formed between the signal bridge and the lower electrode and between the lower electrode and the lower substrate to prevent the signal bridge and the lower electrode as well as the lower electrode and the lower substrate from short-circuiting.

15. The infrared bolometer as claimed in claim 2, wherein an insulating layer is formed between the signal bridge and the lower electrode and between the lower electrode and the lower substrate to prevent the signal bridge and the lower electrode as well as the lower electrode and the lower substrate from short-circuiting.

16. The infrared bolometer as claimed in claim 1, wherein an insulating layer is formed between the signal bridge and the lower electrode and between the lower electrode and the lower substrate to prevent the signal bridge and the lower electrode as well as the lower electrode and the lower substrate from short-circuiting.

* * * * *